(12) United States Patent
Inoue et al.

(10) Patent No.: US 12,466,489 B2
(45) Date of Patent: Nov. 11, 2025

(54) UTILITY VEHICLE

(71) Applicant: Kubota Corporation, Osaka (JP)

(72) Inventors: Masashi Inoue, Sakai (JP); Yusuke Endo, Sakai (JP); Noriyasu Honjo, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/960,457

(22) Filed: Nov. 26, 2024

(65) Prior Publication Data

US 2025/0304176 A1 Oct. 2, 2025

(30) Foreign Application Priority Data

Apr. 1, 2024 (JP) .................................. 2024-058934

(51) Int. Cl.
*B60J 5/04* (2006.01)
*B62D 23/00* (2006.01)

(52) U.S. Cl.
CPC .......... *B62D 23/005* (2013.01); *B60J 5/0487* (2013.01)

(58) Field of Classification Search
CPC ......... B62D 23/005; B60J 5/0487; B60J 5/00; B60J 10/00; B60J 1/00
See application file for complete search history.

(56) References Cited

U.S. PATENT DOCUMENTS

| | | | | |
|---|---|---|---|---|
| 4,644,699 | A * | 2/1987 | Chandler | ............... B60J 5/0487 49/501 |
| 10,632,823 | B1 * | 4/2020 | Osorio | ................... B60J 5/0416 |

FOREIGN PATENT DOCUMENTS

JP 2022174966 A 11/2022

* cited by examiner

*Primary Examiner* — Paul N Dickson
*Assistant Examiner* — Matthew Joseph Ganci
(74) *Attorney, Agent, or Firm* — The Webb Law Firm

(57) ABSTRACT

A utility vehicle includes a driver section configured to accommodate an occupant and an entrance door including an inner face portion facing the driver section, an outer face portion opposite to the driver section, and an opening extending from the inner face portion through to the outer face portion. The entrance door is configured to expose and block an entrance of the driver section. A lock mechanism is configured to hold the entrance door in a closed state, and a single operation member is disposed at the opening for use to release the entrance door from the lock mechanism.

8 Claims, 5 Drawing Sheets

UTILITY VEHICLE

CROSS REFERENCE TO RELATED APPLICATION

This application claims priority to Japanese Patent Application No. 2024-058934 filed Apr. 1, 2024, the disclosure of which is hereby incorporated by reference in its entirety.

BACKGROUND OF THE INVENTION

Field of the Invention

The present invention relates to a utility vehicle.

Description of Related Art

JP 2022-174966 A, for example, discloses a utility vehicle including a driver section configured to accommodate an occupant and an entrance door configured to expose and block an entrance of the driver section and provided with an operation member for use to open and close the entrance door. The entrance door may be provided with two operation members for respective inner and outer face portions. Including a single operation member allows fewer parts involved, but at the same time makes it difficult to operate the operation member from either inside or outside the utility vehicle.

SUMMARY OF THE INVENTION

The present invention provides a utility vehicle including an entrance door easily openable and closable from both inside and outside the utility vehicle with a simple configuration.

A utility vehicle according to the present invention includes:
- a driver section configured to accommodate an occupant;
- an entrance door including:
  - an inner face portion facing the driver section;
  - an outer face portion opposite to the driver section; and
  - an opening extending from the inner face portion through to the outer face portion,
  the entrance door being configured to expose and block an entrance of the driver section;
- a lock mechanism configured to hold the entrance door in a closed state; and
- a single operation member disposed at the opening for use to release the entrance door from the lock mechanism.

The operation member is at an opening in the entrance door as above to be operated by a person inside or outside the utility vehicle. The above configuration involves only one operation member, so that the number of parts involved is fewer than in the case of including two operation members at the respective inner and outer face portions of the entrance door. As described above, the utility vehicle includes an entrance door easily openable and closable from both inside and outside the utility vehicle with a simple configuration.

The utility vehicle may preferable further include:
- an occupant's seat disposed in the driver section and including a seating section on which the occupant is able to sit,
- wherein the operation member corresponds in position to an upper face of the seating section.

With the above configuration, the operation member for use by an occupant corresponds in position to the upper face of the seating section, meaning that the occupant moves their hand to a position below their waist to reach the operation member. The above configuration thereby allows an occupant to consciously use the operation member, as compared to the case of including an operation member above the upper face of a seating section.

The utility vehicle may preferable be configured such that the inner face portion includes an inclined portion disposed adjacently above the opening and so inclined that a portion further upward is laterally further inward as viewed in a front-back direction relative to a body of the utility vehicle.

The above configuration allows an occupant to reliably see the operation member from above, as compared to the case of the inner face portion not including an inclined portion.

The utility vehicle may preferable further include:
- an occupant's seat disposed in the driver section on which occupant's seat the occupant is able to sit,
- wherein the inclined portion has an imaginary extension line extending at an angle of the inclination through at least either an upper portion of the occupant's seat or the operation member as viewed in the front-back direction relative to the body.

The above configuration allows an occupant to more reliably see the operation member from above.

The utility vehicle may preferable further include:
- an axial member coupled to a front portion of the entrance door and allowing the entrance door to swing to be opened and closed; and
- a vertically extending frame element attached to a portion of the entrance door which portion is opposite to the axial member across the opening,
- wherein the frame element holds the lock mechanism and the operation member.

The frame element increases the rigidity of a back portion of the entrance door. The frame element, which holds the lock mechanism and the operation member, allows the lock mechanism to hold the entrance door firmly.

The above-mentioned and other embodiments, procedures, features, and effects of the present invention will be more apparent from the following detailed description of the embodiments with reference to the drawings.

DESCRIPTION OF THE INVENTION

Figure 1:
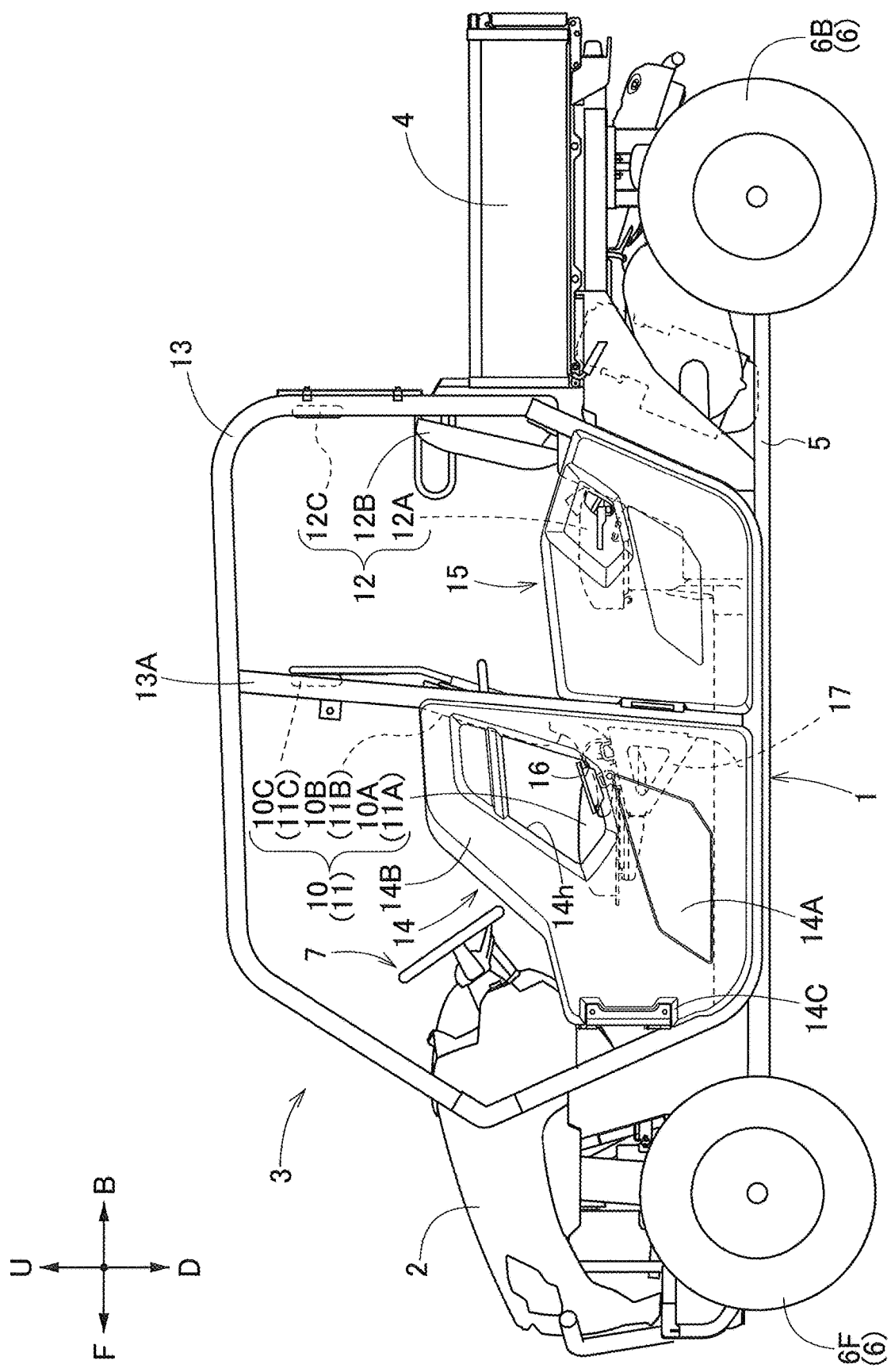
FIG. 1 is a left side view of a utility vehicle.

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

Overall Configuration of Utility Vehicle

The description below deals with a utility vehicle as the present embodiment. As illustrated in FIG. 1, the utility vehicle includes a body 1, a hood 2, a driver section 3 configured to accommodate occupants, and a dump-type carrier box 4. The body 1 includes a body frame 5 and is provided with a travel device 6. The utility vehicle includes a water-cooling engine (not illustrated in the drawings) and a transmission device (not illustrated in the drawings). The engine transmits motive power to the transmission device, which then adjusts the motive power and transmits the resulting motive power to the travel device 6. The utility vehicle may be an electrically operated utility vehicle including a travel electric motor.

The travel device 6 includes a pair of left and right front wheels 6F drivable and capable of being turned and a pair of left and right rear wheels 6B drivable and incapable of being turned. The travel device 6 has a drive mode switchable between a two-wheel drive mode, in which only the rear wheels 6B are driven, and a four-wheel drive mode, in which both the front and rear wheels 6F and 6B are driven.

The driver section 3 includes a steering section 7, a driver's seat 10, an auxiliary seat 11, a back seat 12, a roll-over protective structure (ROPS) 13 for occupant protection, a pair of left and right front entrance doors 14, and a pair of left and right rear entrance doors 15. The carrier box 4 is backward of the driver section 3. The front and rear entrance doors 14 and 15 are each configured to expose and block an entrance of the driver section 3. The utility vehicle includes a seat frame 17 supporting the driver's seat 10 and the auxiliary seat 11. The ROPS 13 includes a pair of left and right center pillars 13A each disposed at a central portion in the front-back direction and having a lower portion by which the corresponding rear entrance door 15 is held in such a manner as to be swingable to be opened and closed. The front entrance doors 14 correspond to the "entrance door" as described herein. The driver's seat 10, the auxiliary seat 11, and the back seat 12 correspond to the "occupant's seat" as described herein.

The steering section 7 includes a steering wheel for use to turn the front wheels 6F, an accelerator pedal for use to adjust the travel speed, a brake pedal for use to brake the utility vehicle, and operation members such as a shift lever for use to shift gears.

The driver's seat 10 is configured to accommodate an occupant who drives the utility vehicle. The auxiliary seat 11 is laterally adjacent to the driver's seat 10. The driver's seat 10 is to the left relative to the body 1, whereas the auxiliary seat 11 is to the right relative to the body 1.

The driver's seat 10 includes a seating section 10A on which an occupant is able to sit, a backrest 10B at a back portion of the seating section 10A, and a headrest 10C supported by the backrest 10B. The driver's seat 10 is slidable in the front-back direction to allow an occupant thereon to adjust its position in the front-back direction. The backrest 10B has an adjustable angle to allow an occupant on the driver's seat 10 to adjust the reclining angle of the backrest 10B.

The auxiliary seat 11 for the present embodiment is a seat on which two occupants are able to sit. The auxiliary seat 11 includes a seating section 11A on which two occupants are able to sit, a backrest 11B at a back portion of the seating section 11A, and two headrests 11C supported by the backrest 11B. The backrest 11B has an adjustable angle to allow an occupant on the auxiliary seat 11 to adjust the reclining angle of the backrest 11B.

The back seat 12 for the present embodiment is a seat on which three occupants are able to sit. The back seat 12 includes a seating section 12A on which three occupants are able to sit, a backrest 12B at a back portion of the seating section 12A, and three headrests 12C supported by the backrest 12B.

Configuration of Front Doors

Figure 2:
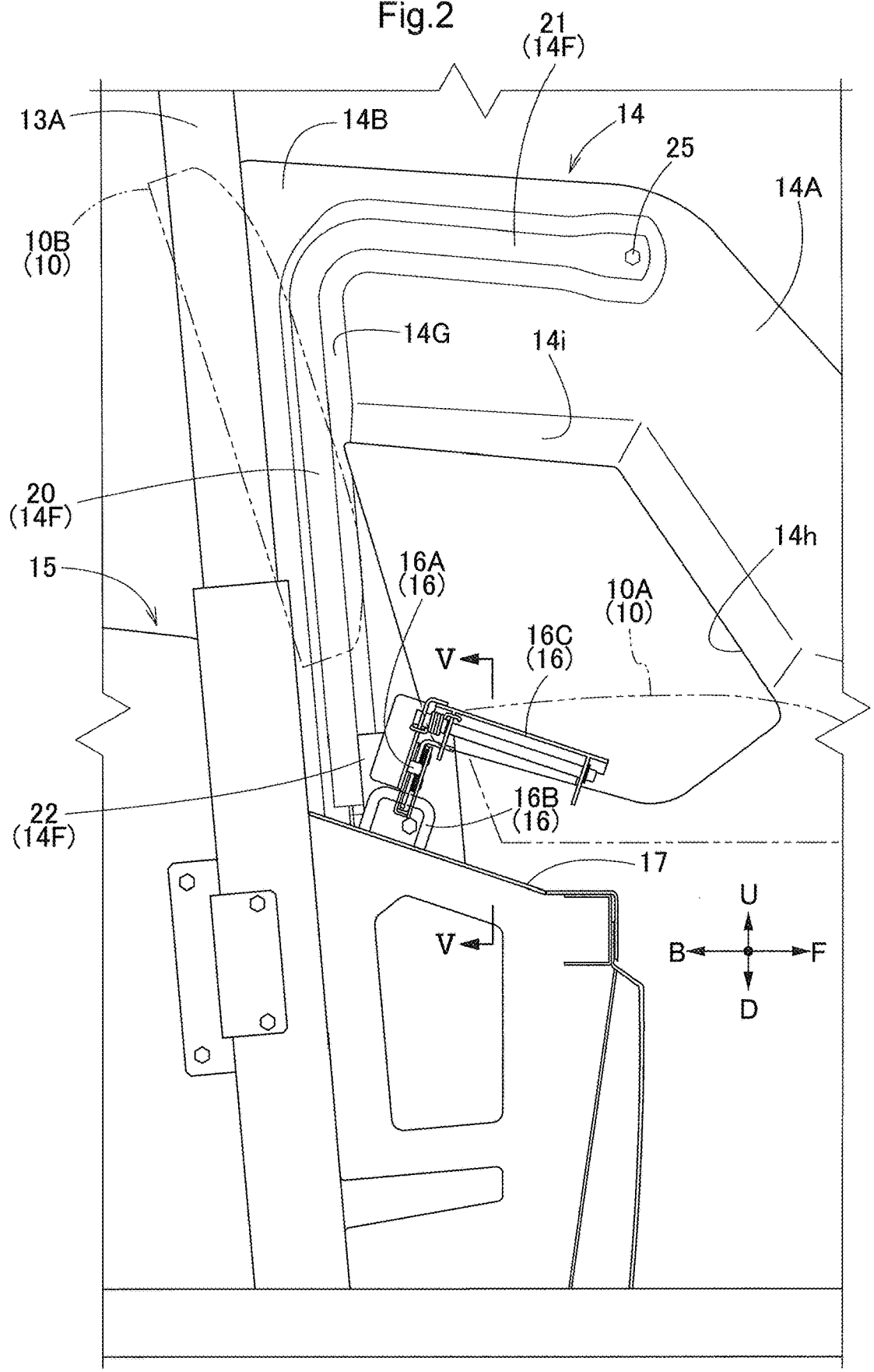
FIG. 2 is a right side view of a driver section and a front entrance door.

As illustrated in FIGS. 1 and 2, the front entrance doors 14 each include a door section 14A and a hinge 14C coupled to a front portion of the door section 14A and to a front portion of the ROPS 13. The hinge 14C allows the door section 14A to swing about the vertical swing axis of the hinge 14C. As illustrated in FIG. 1, with the front entrance door 14 closed, the door section 14A has a free end portion overlapping with the corresponding center pillar 13A from the upper end portion to the lower end portion in a side view of the body 1. The hinge 14C corresponds to the "axial member" as described herein.

Figure 3:
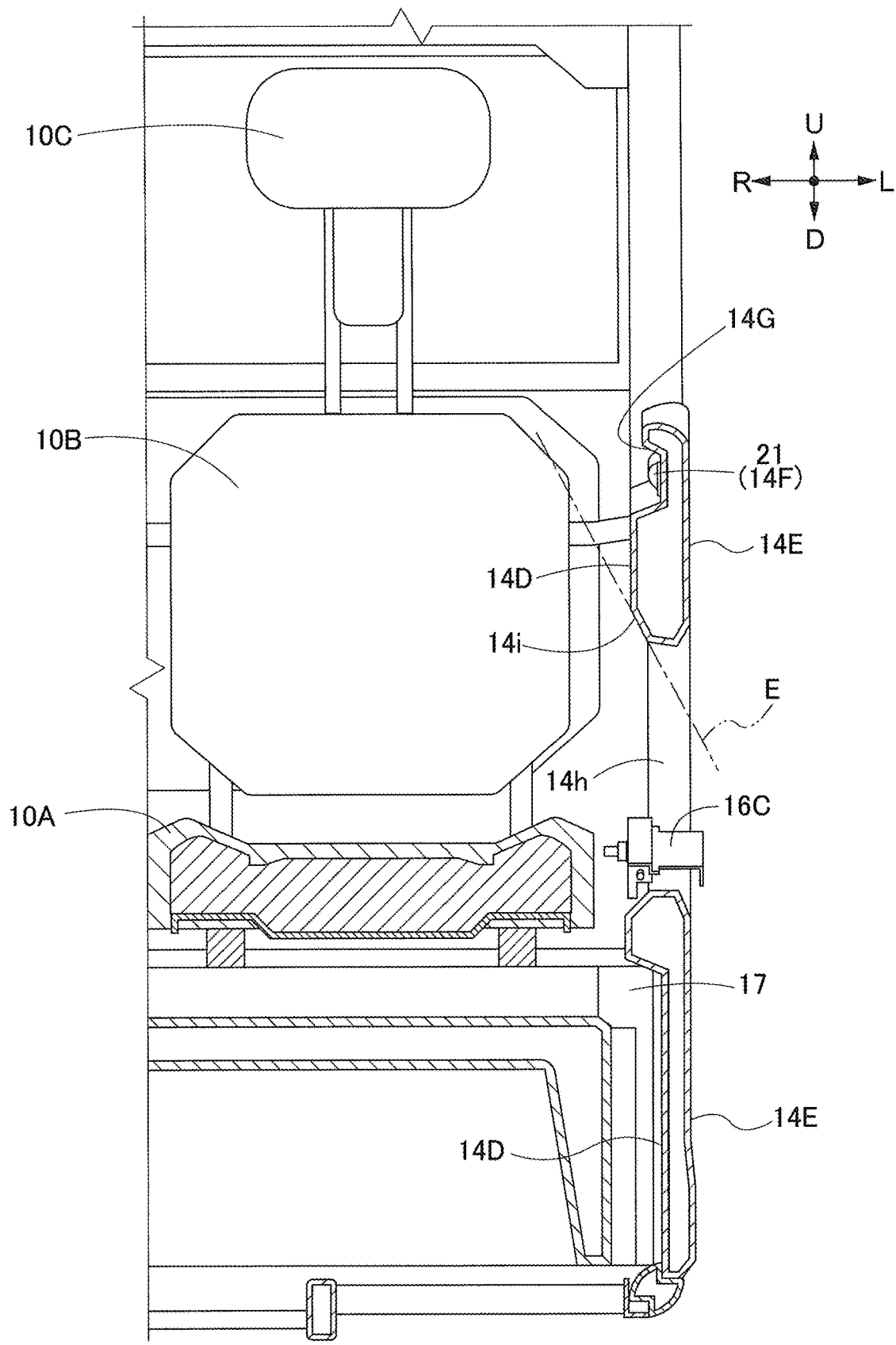
FIG. 3 is a cross-sectional front view of an entrance door with a door lever, illustrating where the door lever is located.

As illustrated in FIG. 3, the door section 14A includes an inner face portion 14D facing the driver section 3 and an outer surface portion 14E opposite to the driver section 3.

The door section 14A has an upper end corresponding in position to the upper end of the backrest 10B, 11B. This configuration allows the door section 14A of the left front entrance door 14 to receive at an upper portion thereof the left shoulder of an occupant on the driver's seat 10 when the utility vehicle turns right and is subjected to a leftward centrifugal force.

The above configuration also allows the door section 14A of the right front entrance door 14 to receive at an upper portion thereof the right shoulder of an occupant on the auxiliary seat 11 or an object on the seating section 11A when the utility vehicle turns left and is subjected to a leftward centrifugal force.

As described above, the front entrance doors 14 each include a door section 14A with an upper portion serving as what is called a shoulder guard. The front entrance doors 14, in other words, each include a shoulder guard 14B extending upward to correspond in position to the upper end of the backrest 10B, 11B and having a front-back dimension equivalent to the entire front-back slidable range of the driver's seat 10.

The door section 14A, including the shoulder guard 14B, is made of a resin such as polyvinyl chloride or a fiber-reinforced plastic. The door section 14A receives from a shoulder of an occupant or an object a laterally outward load relative to the body 1. In view of that, the front entrance doors 14 for the present embodiment each include a frame element 14F provided for the shoulder guard 14B to reinforce the door section 14A for increased rigidity. The frame element 14F is attached to a portion of the front entrance door 14 which portion is opposite to the hinge 14C across an opening 14h.

The frame element 14F is attached to the inner face portion 14D, which serves as the shoulder guard 14B.

The frame element 14F includes a vertically extending portion 20, a laterally extending portion 21, and a planar portion 22. The vertically extending portion 20 extends vertically. The laterally extending portion 21 extends from an upper end portion of the vertically extending portion 20 in the front-back direction, as a result of bending an upper portion of the vertically extending portion 20. The term "front-back direction" refers to such a direction with the front entrance door 14 closed. The planar portion 22 is welded to a lower end portion of the vertically extending portion 20.

The inner face portion 14D has a depression 14G around the vertically extending portion 20, the laterally extending portion 21, and the planar portion 22, the depression 14G having a depth toward the outer surface portion 14E. The frame element 14F is so attached to the depression 14G as to have a laterally inward portion relative to the body 1 which laterally inward portion is recessed laterally outward of the inner face portion 14D relative to the body 1. Even if the frame element 14F has a laterally inward portion relative to the body 1 which laterally inward portion protrudes from the inner face portion 14D toward the driver section 3, the depression 14G reduces the amount of the protrusion, as compared to the case of the frame element 14F not having a depression 14G.

The frame element 14F is attached to the door section 14A specifically as follows: The planar portion 22 includes an attachment section 25, whereas the laterally extending portion 21 has a leading end portion with an attachment section 25. The attachment sections 25 each have a hole through which to insert, for example, a bolt or clip. Inserting a bolt or clip through each attachment section 25 and fixing the bolt or clip to the depression 14G attaches the frame element 14F to the door section 14A.

The utility vehicle as the present embodiment includes a pair of lock mechanisms 16 provided for the respective front entrance doors 14 and each configured to hold the corresponding front entrance door 14 in its closed state.

Figure 4:
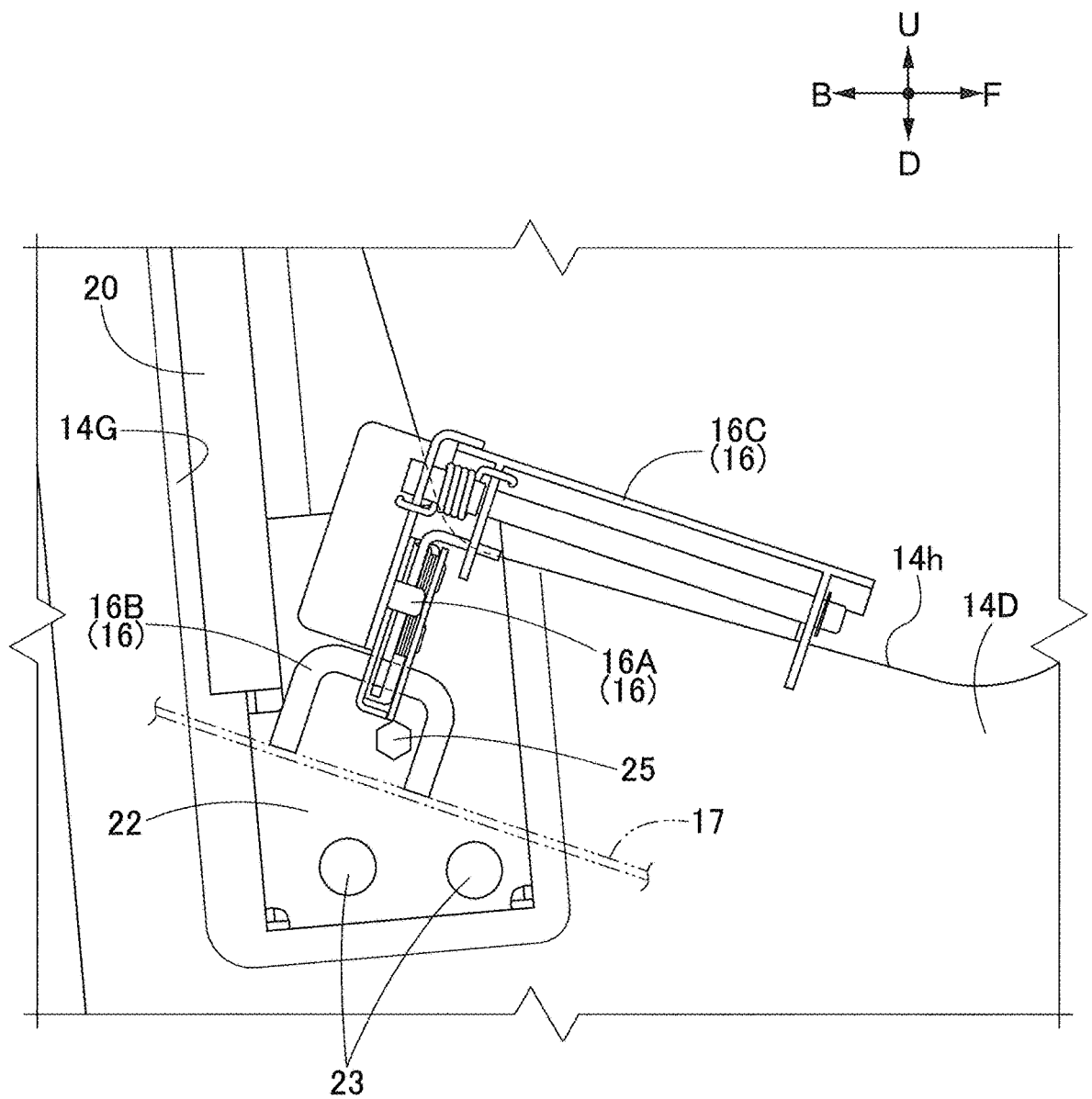
FIG. 4 is a right side view of a lock mechanism and a contact section both attached to a lower portion of a frame element.
Figure 5:
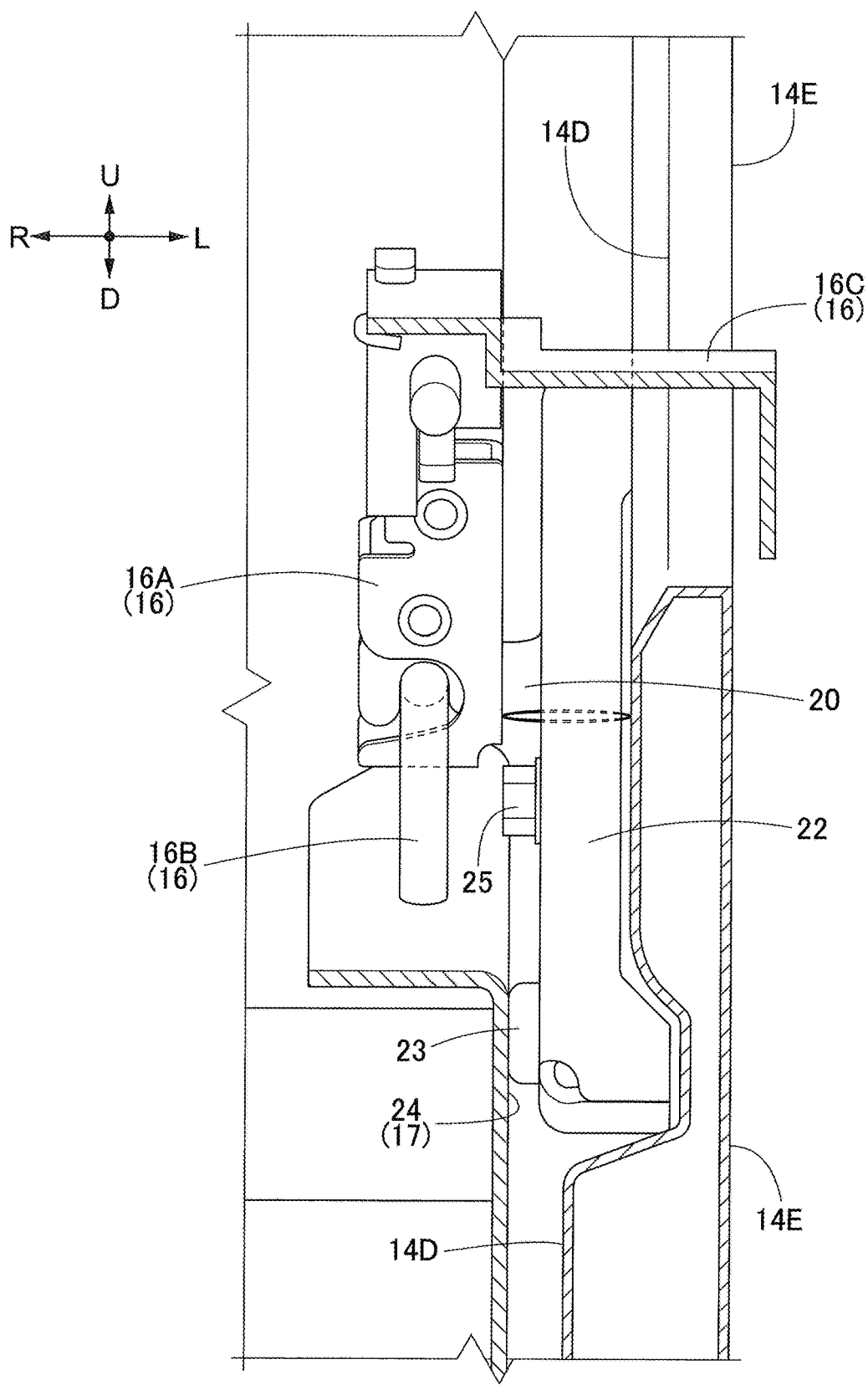
FIG. 5 is a cross-sectional view taken along line V-V in FIG. 2, illustrating where a door lever is located on an entrance door.

As illustrated in FIGS. 2, 4, and 5, the lock mechanisms 16 each include a snatch lock 16A, a striker 16B, and a door lever 16C. The door lever 16C corresponds to the "operation member" as described herein.

The door section 14A of each front entrance door 14 has at a back portion an opening 14h extending from the inner face portion 14D through to the outer surface portion 14E. The opening 14h is in a vertically central portion of the door section 14A, and is closer to the free end of the door section 14A than to its base end. The door lever 16C is at the opening 14h to be operated by a person inside or outside the driver section 3.

The door lever 16C is below the seating surface of the seating section 10A, 11A to reduce the risk of an occupant in the driver section 3 accidentally touching the door lever 16C with a hand, as compared to the case of the door lever 16C being above the seating surface.

The inner face portion 14D includes an inclined portion 14i disposed adjacently above the opening 14h and so inclined that a portion further upward is laterally further inward relative to the body 1 as viewed in the front-back direction relative to the body 1. As illustrated in FIG. 3, the inclined portion 14i has an imaginary extension line E extending upward through an upper left portion of the backrest 10B and downward through a position laterally outward of the door lever 16C relative to the body 1. The right front entrance door 14 is configured similarly (not illustrated in the drawings): The inclined portion 14i has an imaginary extension line E extending upward through an upper right portion of the backrest 11B of the auxiliary seat 11 and downward through a position laterally outward of the door lever 16C relative to the body 1.
This configuration allows an occupant on the driver's seat 10 to reliably see the door lever 16C from above and easily use the door lever 16C, as compared to the case of the inner face portion 14D not including an inclined portion 14i.

The snatch lock 16A is bolted to the planar portion 22, which is at a lower portion of the frame element 14F, and holds the door lever 16C. The striker 16B is attached to the seat frame 17.

Closing the front entrance door 14 hooks the snatch lock 16A on the striker 16B as illustrated in FIGS. 4 and 5. The front entrance door 14, in the closed state, holds its position as a result of the snatch lock 16A being engaged with the striker 16B.

Swinging the door lever 16C upward unhooks the snatch lock 16A from the striker 16B for disengagement. This allows an occupant to move the door section 14A laterally outward relative to the body 1 to open the door section 14A.

As described above, the door lever 16C is configured to move the snatch lock 16A to engage and disengage the snatch lock 16A with and from the striker 16B.

When the utility vehicle makes a turn and is subjected to a lateral centrifugal force relative to the body 1, the door section 14A receives at an upper portion thereof a lateral force relative to the body 1 from a shoulder of an occupant on the auxiliary seat 11 or an object on the seating section 11A. The snatch lock 16A engages with the striker 16B at a vertically central portion of a back portion of the door section 14A. A lateral force relative to the body 1 on an upper portion of the door section 14A thus applies (i) a laterally outward twisting force relative to the body 1 to a portion of the door section 14A which portion is above the position where the snatch lock 16A engages with the striker 16B and (ii) a laterally inward twisting force relative to the body 1 to a portion of the door section 14A which portion is below the position of the engagement.

To deal with the twisting forces, the front entrance door 14 for the present embodiment includes a contact section 23 made of rubber (that is, an elastic material) and attached to a portion of the planar portion 22 of the frame element 14F which portion is below the snatch lock 16A. The contact section 23 may be made of, for example, silicone.

The seat frame 17 includes a planar portion 24 facing the portion of the planar portion 22 to which the contact section 23 is attached. Closing the front entrance door 14 brings the contact section 23 into contact with the planar portion 24. The contact section 23, which is made of rubber, softens the impact that the planar portion 22 causes on the planar portion 24 when an occupant closes the front entrance door 14.

When the door section 14A receives at an upper portion thereof a lateral force relative to the body 1, the contact section 23 and the planar portion 24 in contact with each other receive a laterally inward force relative to the body 1 at a lower portion of the door section 14A. This prevents a lower portion of the door section 14A from being twisted.

The frame 14F increases the rigidity of a back portion of the door section 14A. This prevents an upper portion of the door section 14A from being twisted laterally outward relative to the body 1 when the contact section 23 and the planar portion 24 receive a laterally inward force relative to the body 1 at a lower portion of the door section 14A.

Alternative Embodiments

The present invention is not limited to the above embodiment as an example. The description below deals with embodiments of the present invention as other typical examples.
(1) The rear entrance doors 15 may each have an opening as with the front entrance doors 14. The rear entrance doors 15 may each include a door lever operable through the opening by a person from laterally inward or outward relative to the body.

(2) The front entrance doors 14 may each exclude the shoulder guard 14B.

(3) The embodiment described above is configured such that the inclined portion 14*i* of the left front entrance door 14 has an imaginary extension line E extending upward through an upper left portion of the backrest 10B of the driver's seat 10 and that the inclined portion 14*i* of the right front entrance door 14 has an imaginary extension line E extending upward through an upper right portion of the backrest 11B of the auxiliary seat 11. The embodiment may additionally or alternatively be configured such that the imaginary extension line E of the inclined portion 14*i* of each front entrance door 14 extends through the door lever 16C. In other words, each inclined portion 14*i* may have an imaginary extension line E extending at the angle of the inclination through at least either an upper portion of the occupant's seat (namely, the driver's seat 10 or the auxiliary seat 11) or the door lever 16C as viewed in the front-back direction relative to the body.

(4) The door section 14A may exclude the inclined portion 14*i* at the inner face portion 14D.

(5) The utility vehicle described above includes a back seat 12 and rear entrance doors 15.

The utility vehicle may exclude the back seat 12 and the rear entrance doors 15.

(6) The striker 16B may be held by, for example, the corresponding center pillar 13A instead of the seat frame 17.

(7) The front entrance doors 14 may each exclude the frame element 14F attached thereto. In that case, the snatch lock 16A and the door lever 16C may be held by another component of the front entrance door 14.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

The present invention is applicable to utility vehicles.

What is claimed is:

1. A utility vehicle, comprising:
    a driver section configured to accommodate an occupant;
    an entrance door comprising:
        an inner face portion facing the driver section;
        an outer face portion opposite to the driver section; and
        an opening extending entirely through the entrance door from the inner face portion through to the outer face portion,
    wherein the entrance door is configured to expose and block an entrance of the driver section;
    a lock mechanism configured to hold the entrance door in a closed state; and
    a single operation member disposed within the opening and accessible from both the inner face portion and the outer face portion, wherein the single operation member is configured for use to release the entrance door from the lock mechanism.

2. The utility vehicle according to claim 1, further comprising:
    an occupant's seat disposed in the driver section and comprising a seating section on which the occupant is able to sit, and
    wherein the operation member corresponds in position to an upper face of the seating section.

3. The utility vehicle according to claim 1, wherein:
    the inner face portion comprises an inclined portion disposed adjacently above the opening and so inclined that a portion further upward is laterally further inward as viewed in a front-back direction relative to a body of the utility vehicle.

4. The utility vehicle according to claim 3, further comprising:
    an occupant's seat disposed in the driver section on which occupant's seat the occupant is able to sit, and
    wherein the inclined portion has an imaginary extension line extending at an angle of the inclination through at least either an upper portion of the occupant's seat or the operation member as viewed in the front-back direction relative to the body.

5. The utility vehicle according to claim 1, further comprising:
    an axial member coupled to a front portion of the entrance door and allowing the entrance door to swing to be opened and closed; and
    a vertically extending frame element attached to a portion of the entrance door which portion is opposite to the axial member across the opening,
    wherein the frame element holds the lock mechanism and the operation member.

6. The utility vehicle according to claim 3, wherein the inclined portion is positioned to facilitate an occupant's access to and visibility of the operation member.

7. The utility vehicle according to claim 5, wherein the frame element is attached and fixed to the inner face portion.

8. The utility vehicle according to claim 7, wherein the inner face portion includes a depression recessed toward the outer face portion, and the frame element is attached and fixed to the depression.

* * * * *